May 9, 1967 S. A. CLAPP ETAL 3,318,174
TRANSMISSION
Filed July 30, 1964
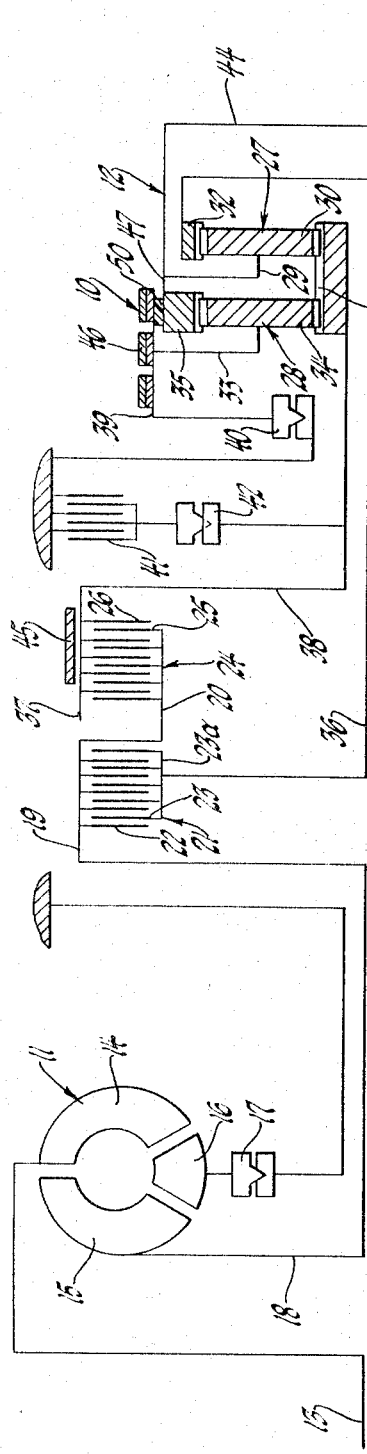
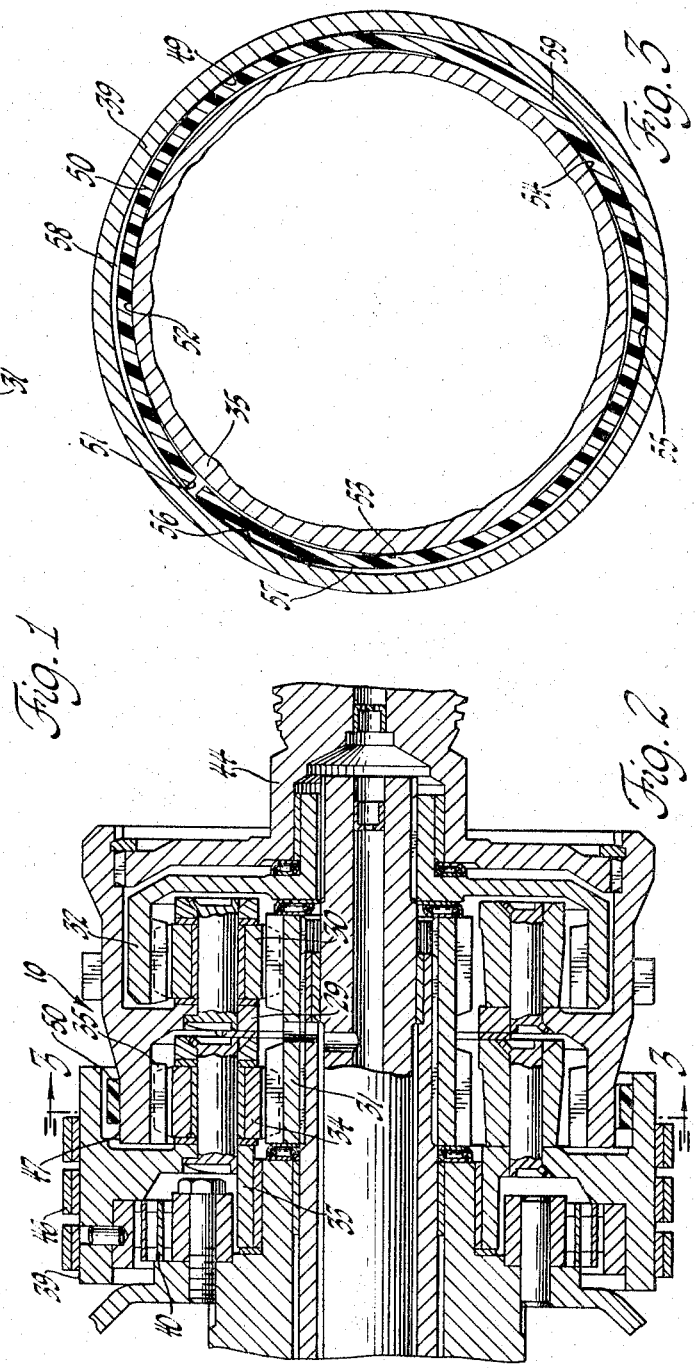
INVENTORS
Samuel A. Clapp, &
BY Kenneth E. Snyder
Robert L. Spencer
ATTORNEY

United States Patent Office 3,318,174
Patented May 9, 1967

3,318,174
TRANSMISSION
Samuel A. Clapp, Ann Arbor, and Kenneth E. Snyder, Northville, Mich., assignors to General Motors Corporation, Detroit, Mich., a corporation of Delaware
Filed July 30, 1964, Ser. No. 386,262
10 Claims. (Cl. 74—753)

This invention relates to transmissions, and more particularly to an improved transmission for use in automotive vehicles of the automatic type.

In transmissions of the type described, the gear assembly includes a power delivery planet carrier and a ring gear integral with the carrier such that the carrier and ring gear both rotate at output shaft speed. It has been found that the planetary gearing is objectionable due to the gear noise or howl. The present invention provides a gear noise reducer in the form of a ring on the carrier and disposed outwardly on the opposite side of the carrier from the ring gear such that the noise reducing ring and ring gear lie in the plane of rotation of the ring gear. The ring firmly grips the power delivery carrier for rotation therewith.

Transmissions of the type described also commonly provide a reaction carrier adapted to be gripped by a brake band upon shift from neutral to either reverse or forward drive low gear operation. It has been found that due to fluid drag in the transmission and particularly in the transmission clutches, the reaction carrier is rotated when the transmission is conditioned for neutral operation with the clutches released. Due to this fact, a torque reaction jar or bump is apparent upon shift from neutral to reverse drive. The gear noise silencing ring here employed is constructed to prevent rotation of the reaction carrier when the transmission is in neutral condition of operation. This permits the brake band to be applied to a nonrotating reaction carrier upon shift from neutral to reverse drive and thereby eliminates the problem of timing the rate of application of the band to the reaction carrier and eliminates the reaction bump formerly present.

The gear noise silencer ring is of noncircular configuration, is disposed between cylindrical surfaces formed on the output carrier and the reaction carrier, rotates with the output carrier and is in close running fit with the reaction carrier. More specifically, the noise reducer ring functions to hold the reaction carrier stationary when the transmission is conditioned for neutral operation due to the friction created by the gear noise silencer ring which provides a positive interference between the output carrier and a drum on the reaction carrier, the ring thus acting as a spring. The ring reduces the rate of discharge of lubricating oil from the gear cavity and provides channels for flow of lubricating fluid between the outer surface of the ring and the reaction carrier such that the useful life of the reaction ring is greatly extended. The ring is split transversely at one side to permit the running fit between the ring and reaction carrier to be automatically maintained throughout a wide range of ring wear.

These and other advantages of this invention will be apparent from the following specification and claims, taken in conjunction with the accompanying drawings, in which:

FIGURE 1 is a schematic drawing of a transmission incorporating this invention.

FIGURE 2 is a longitudinal sectional view through the transmission gearing shown schematically in FIGURE 1.

FIGURE 3 is a sectional view taken along the line 3—3 of FIGURE 2, but with the gearing removed.

Referring to FIGURE 1, there is shown a schematic diagram of a transmission incorporating a gear silencer ring according to the teachings of this invention. The transmission indicated generally at 10 includes a torque converter indicated generally at 11, a planetary gearing unit indicated generally at 12, and drive ratio control means hereafter described.

Torque converter 11 includes an engine driven power input shaft 13 for driving an impeller 14, a turbine 15 and a bladed reaction member 16. A one-way brake 17 prevents reverse rotation of reaction member 16 and permits forward free rotation of the reaction member. A turbine driven shaft 18 drives clutch hubs 19 and 20. A forward drive clutch 21 includes clutch discs 22 and 23 and a direct drive clutch 24 includes clutch discs 25 and 26.

A planetary gearing system indicated generally at 12 includes first and second planetary gearing units 27 and 28. Gear unit 27 includes a power delivery planet carrier 29 supporting a planet pinion 30 in mesh with a sun 31 and a ring 32. Gear unit 28 includes a reaction planet carrier 33 supporting a planet gear 34 in mesh with a ring gear 35 and sun gear 31. Clutch drum 23a of forward drive clutch 21 is connected to ring gear 32 by a shaft 36. Clutch drum 37 of clutch 24 is connected to sun gear 31 by a shaft 38. A planet carrier drum 39 on carrier 33 is held against reverse rotation and permitted to rotate forwardly by a one-way brake 40. An intermediate disc brake 41 when engaged, renders a one-way brake 42 connected to shaft 38 effective to prevent reverse rotation of sun gear 31.

Planet carrier 29 is connected both to ring gear 35 and to a final power delivery shaft 44. Additional controls include a brake 45 effective when engaged to prevent rotation of clutch drum 37, shaft 38 and sun gear 31 in either direction and a brake 46 effective when engaged to prevent rotation of planet carrier 33 in either direction.

In operation, the transmission is capable of providing neutral, three forward drive ratios and reverse. For neutral operation, all clutches and brakes are released. In neutral there is no reaction member for the gearing and except for fluid drag, no power will be transmitted from the torque converter to the gearing. However, due to fluid drag in clutches 21 and 24, some torque will be transmitted to the gearing tending to cause forward rotation of planet carrier 33. One-way brake 40 will permit free forward rotation of carrier 33 in neutral condition of operation.

For forward drive, high range operation, forward drive clutch 21 is engaged to drive ring 32 through shafts 18 and 36. Forward or clockwise rotation of ring gear 32 causes rear pinions 30 to rotate clockwise and drive sun gear 31 counterclockwise. In turn, sun gear 31 drives the front pinions 34 clockwise. Front ring gear 35 and planet carrier 29 and output shaft 44 all rotate clockwise. Reaction for the gearing assembly is taken by the reaction carrier 33 and one-way brake 40 to the transmission case. Carrier 33 tends to rotate counterclockwise but is prevented from such rotation by one-way brake 40.

For high range, second speed operation, the forward drive clutch 21 remains engaged and intermediate disc brake 41 is engaged to render one-way brake 42 effective to hold sun gear 31 against counterclockwise rotation. Turbine torque is now applied through forward clutch through shaft 36 to ring gear 32 in a clockwise direction. Clockwise rotation of the rear internal gear 32 turns the rear planetary pinions 30 clockwise against the stationary sun gear 31. This causes the output carrier 29 and power delivery shaft 44 to rotate forwardly in second gear drive ratio. In second gear, front band 45 is applied to clutch drum 37 to hold the sun gear 31 fixed for overrun engine braking. In the absence of brake 45, the sun gear 31 would overrun the intermediate one-way brake 42.

For direct drive, both forward drive clutch 21 and direct drive clutch 24 are engaged to connect ring gear 32 and sun gear 31 to turbine driven shaft 18. This places the planetary gearing in direct or 1 to 1 drive.

For reverse, forward drive clutch 21 is released, direct clutch 24 is engaged and brake band 46 is engaged. Clockwise rotation of sun gear 31 with carrier 33 held against rotation causes the front pinions 34 and front ring gear 35 to turn counterclockwise in reduction. Ring gear 35 is connected directly to output shaft 44.

In the event that the transmission is operated in low range forward drive, band 46 will be applied to carrier 33 to provide overrun engine braking in low gear.

The particular feature of the present invention is the improvement which comprises a ring 50 carried by a drum extension 47 of planet carrier 29. As best shown in FIGURES 2 and 3, ring 50 grips the external surface of ring gear 35 and is also adapted to contact the internal surface of drum 39 formed on reaction planet carrier 33. As best shown in FIGURE 3, ring 50 is split at 51 and is of noncircular cross section. On the other hand, the external surface of ring gear 35 and the internal surface of reaction carrier drum 39 are each of cylindrical cross section. Ring 50, being of noncylindrical cross section grips the external surface of carrier drum extension 47 at three equally spaced areas 52, 53, 54, and grips the inner cylindrical surface of carrier drum 39 at three equally spaced areas 49, 55, 56. The contact points 52, 53, 54 with the output carrier drum 47 external of ring gear 35 are disposed intermediate the contact points 49, 55, 56 of the reaction carrier drum 39. Ring 50 is preferably formed of plastic material and normally grips carrier drum extension 39 for rotation therewith.

It has been found in the absence of plastic ring 50, the gears are noisy to the point of objection on the part of the user. Transmission gear noise is commonly graded at levels depending upon its amplitude and the addition of the plastic ring 50 has been found to effect a reduction of gear noise by several levels. The ring functions as a noise damper and also as a partial seal in that it prevents undesirable too rapid exhaust of lubricating oil from the gear cavity. In the assembly, the split plastic ring has a snug fit on the outside diameter of ring gear 35 and rotates with the ring gear 35 and carrier 29 at output shaft speed. Ring 50 also has a very close running fit with the inside diameter of the reaction drum 39.

Ring 50, in addition to serving as a gear set noise reducer, also prevents rotation of reaction drum 39 when the transmission is conditioned for neutral or no-drive operation due to friction created by the ring which provides a positive interference between ring gear 35 and reaction drum 39, thus acting as a spring. As heretofore stated, clutches 21 and 24 and brakes 45, 41 and 46 are released in neutral. However, due to fluid drag effect in the transmission, some limited torque is transmitted through clutches 21 and 24 which tends to drive sun 31 and ring 32. Due to the load of the vehicle applied to carrier 29 and ring 35, these members will be unable to rotate. Torque applied therefore would normally cause reaction carrier 33 and its drum 39 to spin freely in the absence of ring 50.

Rotation of carrier 33 and drum 39 in neutral is undesirable, particularly when shifting from neutral into reverse drive. In shifting from neutral to reverse operation, brake 46 is applied to drum 39. In the absence of ring 50, a definite torque reaction bump or shock occurs as the brake 46 is applied to the rotating drum 39. Ring 50, being in a very close running fit relationship with respect to drum 39, prevents rotation of drum 39 when the vehicle is standing still in neutral due to friction created by ring 50 which presents a positive interference between stationary carrier drum extension 47 and drum 39. Thus, upon shifting into reverse, band 46 is applied to a nonrotating drum 39 and the shock is minimized to such an extent that the problem of calibrating the rate of band application is greatly minimized. Due to the fact that ring 50 is split at 51 as shown, the ring is able to accommodate itself for wear and to provide a long useful life. Also, oil in the gear chamber continuously passes through the spaces 57, 58 and 59 between the exterior surface of ring 50 and the internal surface of drum 39. In this manner, wear of the plastic ring on drum 39 is greatly minimized.

There has thus been provided a gear noise reducing ring which greatly reduces gear noise in the transmission and which prevents rotation of the gear set reaction carrier when the transmission is conditioned for neutral operation. The ring reduces the rate of discharge of lubricating oil from the gear cavity and is shaped to provide spaced passages between the ring and reaction carrier drum 39 through which fluid passes as it is discharged from the gear cavity. In this manner the inner surface of the drum on the reaction carrier and the outer surface of the ring are continuously lubricated. The close running fit between the outer surface of ring 50 and the inner surface of drum 39 is such as to prevent rotation of drum 39 in neutral and in combination with the lubrication provided to assure long ring life. As stated, the surface of power delivery carrier drum or extension 47 in the plane of rotation of ring gear 35 is cylindrical. Also, the inner surface of drum 39 of reaction carrier 33 in the plane of rotation of ring gear 35 is cylindrical. Ring 50, which lies in the plane of rotation of ring gear 35 is of noncircular configuration, rotates with ring gear 35 and is in close running fit with drum 39 of reaction carrier 33 and is effective to prevent rotation of drum 39 and carrier 33 when the transmission is conditioned for neutral operation.

We claim:

1. In a transmission, a first gear unit comprising a planet carrier supporting a planet pinion gear in mesh with a ring gear and a sun gear, a second planetary gearing unit including a reaction planet carrier supporting a second planetary pinion gear in mesh with said sun gear and a second ring gear, said second ring gear being rotatable as a unit with said first gear unit carrier, a power delivery shaft driven by said first gear unit carrier, a transmission power input shaft, first and second engageable and releasable clutches effective when engaged to connect said first gear unit ring gear and said sun gear to said power input shaft, and a ring carried by said second gear unit ring gear for reducing gear noise in said transmission, said ring contacting said second gear unit carrier for braking said carrier against rotation upon release of said clutches.

2. In a transmission, a first gear unit comprising a planet carrier supporting a planet pinion gear in mesh with a ring gear and a sun gear, a second planetary gearing unit including a planet carrier supporting a second planet pinion gear in mesh with a second ring gear and said sun gear, said first gear unit carrier and said second gear unit ring gear being fixed to each other for rotation as a unit, a power delivery shaft driven by said first gear unit carrier, brake means for preventing rotation of said second gear unit carrier in at least one direction, a power input shaft, clutch means selectively operable to connect said first gear unit ring gear and said sun gear, respectively, to said power input shaft, and gear silencing means for reducing gear noise comprising a ring fixed for rotation with said second gear unit ring gear, said ring including spaced contact surfaces in contact with said second gear unit carrier for braking said carrier against rotation upon release of said clutches, the spaces between said ring contact surfaces and said carrier forming with said carrier fluid flow passages for conducting lubricating fluid between said ring and carrier.

3. In a transmission, first and second planetary gearing units, said first gearing unit comprising a first planet carrier supporting a planet pinion in mesh with a ring gear and a sun gear, said second planetary gearing unit comprising a second planet carrier supporting a planet pinion gear in mesh with a second ring gear and said sun gear, a power delivery shaft connected to said first carrier and said second ring gear, said first carrier, said second ring gear and said power delivery shaft being rotatable as a unit, means for braking said second planet carrier against rotation in at least one direction, a power input shaft, means for connecting said first gear unit ring gear to said power input shaft including an engageable and releasable clutch, means for connecting said sun gear to said input shaft including a second engageable and releasable clutch, and gear noise reducing means comprising a ring fixed to the external surface of second gear unit ring gear and rotatable therewith, said ring being of non-circular configuration and having spaced contact surfaces on the internal surface of said ring for contacting the external surface of said second gear unit ring gear and having spaced contact surfaces on the external surface of said ring for contacting said second gear unit carrier, said ring braking said carrier against rotation upon release of said clutches, the spaces between said internal ring contact surfaces and said ring gear and the spaces between said external ring contact surfaces and said carrier providing fluid flow channels for flow of lubricating fluid between said ring and ring gear and between said ring and carrier, respectively.

4. In a transmission, first and second planetary gearing units, said first planetary gearing unit comprising a first planet carrier supporting a planet pinion gear in mesh with a first sun and a first ring gear, said second planetary gearing unit comprising a second planet carrier supporting a second planet pinion in mesh with said first sun and a second ring gear, a final power delivery shaft, said first planet carrier being connected for rotation with said power delivery shaft and said second ring gear, a cylindrical surface on said second ring gear, a drum on said second carrier having a cylindrical surface formed thereon and coextensive with the plane of rotation of said ring gear, brake means for preventing rotation of said second carrier in at least one direction of rotation, a power input shaft, engageable and releasable clutch means effective when engaged to connect said input shaft to said first ring gear for driving said first ring gear, engageable and releasable clutch means effective when engaged to connect said input shaft to said sun gear for driving said sun gear, and means disposed between said second ring gear and said second carrier drum for preventing rotation of said second carrier when said engageable and releasable clutch means are released.

5. In a transmission, first and second planetary gearing units, said first planetary gearing unit comprising a first planet carrier supporting a planet pinion gear in mesh with a sun gear and a first ring gear, said second planetary gearing unit comprising a second planetary gearing unit comprising a second planet carrier supporting a second planet pinion in mesh with said sun gear and a second ring gear, a drum on said second carrier having a portion thereof disposed in the plane of rotation of said second ring gear, a power delivery shaft connected for rotation with said first carrier and said second ring gear, means for preventing rotation of said second carrier in at least one direction, a power input shaft, engageable and releasable clutch means effective when engaged to connect said first gear unit ring gear to said power input shaft, second engageable and releasable clutch means effective when engaged to connect said sun gear to said power input shaft, both of said clutch means being released to establish neutral condition of transmission operation, gear silencing means caried by and rotatable with said second gear unit ring gear, said gear silencing means being in close running fit engagement with said second gear unit carrier drum and effective to prevent rotation of said second gear carrier drum when said transmission is conditioned for neutral operation.

6. In a transmission, first and second planetary gearing units, said first gearing unit comprising a first planet carrier supporting a planet pinion gear in mesh with a sun gear and a first ring gear, said second gearing unit comprising a second planet carrier supporting a second planet gear in mesh with said sun gear and a second ring gear, a final power delivery shaft rotatable as a unit with said first planet carrier and said second gear unit ring gear, one-way brake means for preventing rotation of said second gear unit carrier in one direction, a power input shaft, first engageable and releasable clutch means effective when engaged to connect said first ring gear to said power input shaft, second engageable and releasable clutch means effective when engaged to connect said sun gear to said power input shaft, a drum on said second carrier having a portion thereof disposed in the plane of rotation of said second ring gear and spaced from said second ring gear, a gear noise silencing ring disposed in the space between said drum and said second ring gear, said ring being rotated with said second ring gear and in running fit contact with said drum, both of said clutches being released to establish neutral condition of operation, said ring being effective to prevent rotation of said second carrier upon establishment of neutral operation, and a selectively operable brake effective when engaged to prevent rotation of said second gear unit carrier.

7. In a transmission, first and second planetary gearing units, said first gearing unit comprising a first planet carrier supporting a planet pinion gear in mesh with a sun gear and a first ring gear, said second planetary gearing unit comprising a second planet carrier supporting a second planet pinion gear in mesh with a second ring gear and said sun gear, one-way brake means for preventing reverse rotation of said second planet carrier, a final power delivery shaft fixed for rotation as a unit with said first planet carrier and said second ring gear, a drum on said second carrier spaced from said second ring gear and extending into the plane of rotation of said second ring gear, a power input shaft, means for connecting said power input shaft to said first ring gear including a first engageable and releasable clutch, means for connecting said power input shaft to said sun gear including a second engageable clutch, both of said clutches being released to establish neutral condition of transmission operation, and means for reducing gear noise comprising a ring disposed in the space between said second ring gear and said drum, said ring being rotatable with said second ring gear, said ring being in running contact engagement with said drum for preventing forward rotation of said drum in neutral condition of operation, and an additional releasable and engageable brake effective when engaged to prevent both forward and reverse rotation of said drum.

8. In a transmission, first and second planetary gearing units, said first gearing unit comprising a first planet carrier supporting a planet pinion gear in mesh with a sun gear and a first ring gear, said second planetary gearing unit comprising a second planet carrier supporting a second planet pinion gear in mesh with a second ring gear and said sun gear, one-way brake means for preventing reverse rotation of said second planet carrier, a final power delivery shaft connected for rotation as a unit with said first planet carrier and said second ring gear, a drum on said second carrier extending into the plane of rotation of said second ring gear and spaced from said second ring gear, an internal cylindrical surface on said drum, an external cylindrical surface on said second ring gear, a power input shaft, means for connecting said input shaft to said first ring gear including a first clutch, means for connecting said input shaft to said sun gear including a second clutch, both of said clutches being released to establish neutral condition of operation, and means for reducing gear noise comprising a ring of noncircular cross section disposed in the space between said second ring gear and said drum, said ring being rotatable with said second ring gear, said ring forming with said internal surface of said drum spaced channels for flow of lubricating fluid between said drum and ring, said ring being in running fit engagement with said drum and effective to prevent forward rotation of said drum when both of said clutches are released, and an additional engageable and releasable brake effective when engaged to prevent both forward and reverse rotation of said drum irrespective of engagement or release of said clutches.

9. In a transmission of the type having first and second planetary gearing units, each of said units having a planet carrier supporting a pinion gear in mesh with a ring gear, power input means for driving one element of one of said gear units including an engageable and releasable clutch, a power delivery shaft rotatable with said second gear unit ring gear, a gear noise reducing ring carried by said second gear unit ring gear and rotatable with said ring gear for reducing gear noise when said ring gear is rotated, a drum on said second gear unit carrier, said ring contacting said drum to prevent rotation of said second gear unit carrier when said clutch is released.

10. In a transmission of the type having first and second planetary gearing units, each of said units having a planet carrier supporting a planet pinion gear in mesh with a ring gear and a sun gear, power input means for driving said transmission including an engageable and releasable clutch, an output shaft fixed for rotation with said first gear unit carrier and said second gear unit ring gear, a gear noise reducing ring supported upon said second gear unit ring gear for rotation therewith, a drum on said second gear unit carrier, said ring contacting said drum to prevent rotation of said second gear unit carrier when said clutch is disengaged, said ring being split transversely to its plane of rotation to accommodate ring expansion into contact with said second gear unit carrier drum.

References Cited by the Examiner

UNITED STATES PATENTS

| | | | |
|---|---|---|---|
| 1,136,839 | 4/1915 | Seidel | 74—443 |
| 1,467,939 | 9/1923 | Knap | 74—801 |
| 2,460,629 | 2/1949 | Fawick | 74—801 |
| 2,483,779 | 10/1949 | Mucher | 188—83 |
| 2,487,653 | 11/1949 | Heintze | 74—801 |
| 2,568,245 | 9/1951 | McDonald | 188—83 |
| 2,856,794 | 10/1958 | Simpson | 74—763 |
| 3,043,164 | 7/1962 | Sundt | 74—805 |
| 3,218,889 | 11/1965 | Jarchow | 74—801 |

FOREIGN PATENTS 2,700    1877    Great Britain.

DAVID J. WILLIAMOWSKY, *Primary Examiner.*

THOMAS C. PERRY, *Examiner.*